United States Patent
Moloney et al.

(10) Patent No.: US 11,130,685 B2
(45) Date of Patent: *Sep. 28, 2021

(54) FLUORESCENT WATER TREATMENT COMPOUNDS AND METHOD OF USE

(71) Applicant: ChampionX USA Inc., Sugar Land, TX (US)

(72) Inventors: Jeremy Moloney, Katy, TX (US); Kousik Kundu, Houston, TX (US)

(73) Assignee: Championx USA Inc., Sugarland, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/617,658

(22) Filed: Jun. 8, 2017

(65) Prior Publication Data

US 2017/0355628 A1 Dec. 14, 2017

Related U.S. Application Data

(60) Provisional application No. 62/348,397, filed on Jun. 10, 2016.

(51) Int. Cl.
  *C02F 1/52* (2006.01)
  *C02F 1/68* (2006.01)
  (Continued)

(52) U.S. Cl.
  CPC ............ *C02F 1/5209* (2013.01); *B82Y 20/00* (2013.01); *B82Y 40/00* (2013.01); *C01B 32/194* (2017.08);
  (Continued)

(58) Field of Classification Search
  CPC ....... B82Y 20/00; B82Y 40/00; C02F 1/5209; C02F 1/68; C02F 1/56; C02F 5/00;
  (Continued)

(56) References Cited

U.S. PATENT DOCUMENTS 3,436,373 A  4/1969  Cox et al.
4,783,314 A  11/1988 Hoots et al.
(Continued)

FOREIGN PATENT DOCUMENTS

EP  0257876 A2  3/1988
RU  2579388 C2  4/2016
(Continued)

OTHER PUBLICATIONS

Wu, et al., "Fabrication of highly fluorescent graphene quantum dots using L-glutamic acid for in vitro/in vivo imaging ans sensing", Journal of Chemistry C, 2013, pp. 4676-4684.
(Continued)

*Primary Examiner* — Krishnan S Menon
(74) *Attorney, Agent, or Firm* — Kagan Bindor, PLLC

(57) ABSTRACT

Disclosed herein are graphene quantum dot tagged water source treatment compounds or polymers, and methods of making and using. Also described herein are tagged compositions including an industrial water source treatment compound or polymer combined with a graphene quantum dot tagged water source treatment compound or polymer. The tagged materials are tailored to fluoresce at wavelengths with minimized correspondence to the natural or "background" fluorescence of irradiated materials in industrial water sources, enabling quantification of the concentration of the water source treatment compound or polymer in situ by irradiation and fluorescence measurement of the water source containing the tagged water source treatment compound or polymer. The fluorescence measurement methods are similarly useful to quantify mixtures of tagged and untagged water source treatment compounds or polymers present in an industrial water source.

13 Claims, 7 Drawing Sheets

= Graphene quantum dot

(51) Int. Cl.

| | |
|---|---|
| *C09K 11/65* | (2006.01) |
| *C09K 11/02* | (2006.01) |
| *C02F 1/56* | (2006.01) |
| *C01B 32/194* | (2017.01) |
| *B82Y 20/00* | (2011.01) |
| *B82Y 40/00* | (2011.01) |
| *C09K 11/06* | (2006.01) |
| *C02F 5/00* | (2006.01) |
| *C02F 1/66* | (2006.01) |
| *C02F 103/10* | (2006.01) |

(52) U.S. Cl.
CPC ............... *C02F 1/56* (2013.01); *C02F 1/68* (2013.01); *C09K 11/02* (2013.01); *C09K 11/025* (2013.01); *C09K 11/06* (2013.01); *C09K 11/65* (2013.01); *C02F 1/66* (2013.01); *C02F 5/00* (2013.01); *C02F 2103/10* (2013.01); *C02F 2209/003* (2013.01); *C02F 2303/04* (2013.01); *C02F 2303/08* (2013.01); *C02F 2303/12* (2013.01); *C02F 2303/22* (2013.01); *C02F 2305/04* (2013.01); *C08K 2201/011* (2013.01)

(58) Field of Classification Search
CPC .... C02F 1/66; C02F 2303/08; C02F 2303/04; C02F 2303/12; C02F 2209/003; C02F 2303/22; C02F 2305/04; C02F 2103/10; C09K 11/65; C09K 11/025; C09K 11/02; C09K 11/06; C01B 32/194; C08K 2201/011; C23F 11/149
See application file for complete search history.

(56) References Cited

U.S. PATENT DOCUMENTS

| | | | | |
|---|---|---|---|---|
| 5,702,684 | A | 12/1997 | McCoy et al. | |
| 6,566,139 | B2 | 5/2003 | Davis et al. | |
| 8,956,541 | B2 | 2/2015 | Elliott | |
| 8,956,875 | B2 | 2/2015 | Kahaian et al. | |
| 9,309,137 | B2 | 4/2016 | Moore et al. | |
| 2011/0254432 | A1 | 10/2011 | Zeininger | |
| 2014/0121350 | A1 | 5/2014 | You et al. | |
| 2014/0158633 | A1 | 6/2014 | Holt | |
| 2015/0041406 | A1 | 2/2015 | Xiao et al. | |
| 2015/0280248 | A1* | 10/2015 | Tour | H01M 4/9083 502/180 |
| 2016/0097106 | A1* | 4/2016 | Robinson | G01N 17/00 514/44 R |
| 2016/0108327 | A1* | 4/2016 | Pulikkathara | B01D 21/01 166/304 |
| 2016/0231247 | A1 | 8/2016 | Abla et al. | |
| 2017/0096600 | A1* | 4/2017 | Tour | C08K 3/042 |

FOREIGN PATENT DOCUMENTS

| | | | |
|---|---|---|---|
| WO | 2014089214 | A2 | 6/2014 |
| WO | 2015170124 | A1 | 11/2015 |
| WO | 2015174996 | A1 | 11/2015 |
| WO | 2016025051 | A2 | 2/2016 |
| WO | 2016053711 | A1 | 4/2016 |

OTHER PUBLICATIONS

Hluchan, et al., "Amino acids as corrosion inhibitors in hydrochloric acid solutions", Materials and Corrosion, 39(11), Nov. 1, 1988, pp. 512-517.

Muhammad, et al., "The Use of Glutamic Acid as Corrosion Inhibitor for Aluminium in Hcl Solution", IOSR Journal of Applied Chemistry, 7(2), Mar.-Apr. 2014, pp. 50-62.

Zheng, et al., "Glowing Graphene Quantum Dots and Carbon Dots: Properties, Syntheses, and Biological Applications", retrieved from http://onlinelibrary.wiley.com/doi/10.1002/smll.201402648/epdf, Apr. 8, 2015, pp. 1620-1636.

International Search Report for International Application No. PCT/US2017/036540, dated Oct. 18, 2017 (6 pages).

Written Opinion for International Application No. PCT/US2017/036540, dated Oct. 18, 2017 (7 pages).

Bacon, et al., "Graphene Quantum Dots", Particle & Particle Systems Characterization, 31(4), Nov. 27, 2013, pp. 415-428.

Zhu, et al.,"Surface Chemistry Routes to Modulate the Photoluminescence of Graphene Quantum Dots: From Fluorescence Mechanism to Up-Conversion Bioimaging Applications", Advanced Functional Materials, 22(22), Nov. 21, 2012, pp. 4732-4740.

Sun, et al., "Highly Photoluminescent Amino-Functionalized Graphene Quantum Dots Used for Sensing Copper Ions", Chemistry—A European Journal, 19(40), Aug. 12, 2013, pp. 13362-13368.

International Search Report for International Application No. PCT/US2017/036545, dated Aug. 21, 2017 (6 pages).

Written Opinion for International Application No. PCT/US2017/036545, dated Aug. 21, 2017 (8 pages).

Layek, et al., "A review on synthesis and properties of polymer functionalized graphene", Polymer, 54(19), Aug. 1, 2013, pp. 5087-5103.

Song, et al., "Study on the relationship between the structure and activities of alkyl methacrylate-maleic anhydride polymers as cold flow improvers in diesel fuels", Fuel Processing Technology, 86(6), Mar. 25, 2005, pp. 641-650.

International Search Report for International Application No. PCT/US2017/036550, dated Aug. 3, 2017 (6 pages).

Written Opinion for International Application No. PCT/US2017/036550, dated Aug. 3, 2017 (7 pages).

Pan et al., "Hydrothermal Route for Cutting Graphene Sheets into Blue-Luminescent Graphene Quantum Dots", Advanced Materials, 2010, vol. 22, No. 6, pp. 734-738.

Bacon et al., "Graphene Quantum Dots", Particle & Particle Systems Characterization, vol. 31 No. 4, 2014, pp. 415-428.

Karpicz et al., "Laser Fluorosensor For Oil Spot Detection", Lithuanian Journal of Physics, vol. 45, No. 3, 2005, pp. 213-218.

Xu et al., "How comb-type poly(maleic acid alkylamide-co-α-olefin) assemble in waxy oils and improve flowing ability", Asia-Pacific Journal Of Chemical Engineering, vol. 4; pp. 551-556, 2009.

Andreev et al., "Laboratory assessment of corrosion inhibitors effectiveness at oilfield pipelines of West Siberian region. III. Bubble test", Int. J. Corros. Scale Inhib., vol. 2, No. 1, pp. 17-29, 2013.

Kelland, Malcolm A. "History of the Development of Low Dosage Hydrate Inhibitors", An American Chemical Society Journal, Energy & Fuels, vol. 20, No. 3, May/Jun. 2006, pp. 825-847.

Jin et al., "Tuning the Photoluminescence of Graphene Quantum Dots through the Charge Transfer Effect of Functional Groups", ACS Nano , vol. 7, No. 2, pp. 1239-1245, 2013.

Office Action from European Application No. 17739387.3, dated Dec. 11, 2019, 5 pages.

Office Action from European Application No. 17739387.3, dated Jun. 17, 2020, 5 pages.

Neises et al, "Simple method for the esterification of carboxylic acids", Angewandte Chemie International Edition, vol. 17, Issue 7, 1978, pp. 522-524.

Office Action & Search Report mailed in Russian Application No. 2018145990, dated Oct. 13, 2020, 22 pages (including English Translation).

\* cited by examiner

FLUORESCENT WATER TREATMENT COMPOUNDS AND METHOD OF USE

FIELD OF INVENTION

The invention relates to compositions and methods for measuring the concentration of chemical species in industrial water sources.

BACKGROUND

The invention relates to compositions, methods, and apparatuses for measuring chemical dosages. In particular the invention encompasses fluorescent treatment compounds that are functionalized and added to industrial water sources such as wastewater, produced water, injectate, recycled water, or another industrial water source in need of treatment. The invention allows for the efficient treatment of industrial water sources using a treatment method. Water treatment methods commonly employ chemicals for purification, softening, corrosion inhibition, paraffin inhibition, viscosity control, oxygen scavenging, emulsion resolution, adjustment of surface tension, defoaming, flocculation of solids, scale inhibition, hydrate inhibition, asphaltene inhibition, sulfide inhibition, surfactancy, dispersion of components, drag reduction, flow improvement, microbial inhibition, or sterilization of industrial water sources. Industrial water sources, particularly industrial wastewater, can be difficult to treat cost effectively because of its physical and chemical properties. Industrial water sources can be comprised of various chemical and biological species, including suspended solids, emulsified hydrocarbons and byproducts thereof, and dissolved salts. As such, there has been a long-felt but unmet need to more efficiently treat industrial water sources, particularly industrial wastewater.

The literature describes the use of fluorescent materials for tracing treatment chemicals in industrial water sources. The use of fluorescent tracers, such as a tracer chemically bonded to a water treatment chemical ("tagged" water treatment chemical), allows for the efficient treatment of industrial water sources by providing a means to measure the amount of a treatment chemical in real time. A treated water source having the tagged water treatment chemical dispersed or dissolved therein is irradiated with a wavelength of light known to cause a fluorescent emission of the fluorescent tracer. The known fluorescence emission wavelength of the tracer is targeted for measurement. Typically, such measurements are made at one or more points downstream from the point of addition of the tagged water treatment chemical. Quantification of water treatment chemicals in industrial water sources allows the operator to more efficiently treat the industrial water source by avoiding under-dosing or overdosing of water treatment chemicals.

However, the background fluorescence region of many industrial water sources is about 550 nm or less, which overlaps with the fluorescence emission region of many conventional fluorophores. It is very difficult to find an inert (chemically unreactive) fluorophore that overcomes the interference from high fluorescent background and light scattering due to the presence of emulsified hydrocarbons, charged coagulants, dissolved salts and other water soluble or dispersible compounds, flocculants, microbes, and other contaminants present in many industrial water sources.

Accordingly, there is a need for a fluorophore that is useful for tracing treatment chemicals in industrial water sources. Desirably, the fluorophore will overcome the obstacles presented by industrial water sources that make it difficult to fluorescently trace treatment chemicals. Thus, the development of a fluorophore and industrial water treatment chemicals having a fluorophore bonded thereto, wherein the fluorophore has a fluorescence emission range at a wavelength greater than 550 nm would be particularly beneficial.

Reactions to bond fluorophores to water soluble chemicals such as treatment compounds used to treat industrial water sources are commonly problematic because fluorophores are typically relatively hydrophobic compounds that are not compatible with the water soluble or dispersible treatment compounds. Even where such bonding is successful, the fluorophore moieties tend to reduce water solubility of the resulting fluorophore-bonded treatment compound which in turn affects both treatment efficacy and solubility of the treatment compound in the industrial water source. Further, where the treatment compound is a treatment polymer, copolymerization as a method to incorporate fluorophore-bonded monomers into the treatment polymer often results in incomplete incorporation of fluorophore. Instead, phase separation and/or self-polymerization of the fluorophore functional monomers often occurs, wherein the degree of copolymerization is often dependent upon the relative reactivity of the group of monomers selected for copolymerization. Thus, there is a need for novel fluorophore-functionalized monomers that will polymerize with high incorporation of the functionalized monomer into one or more treatment polymers used for treatment of industrial water sources.

BRIEF SUMMARY

Figure 1A:
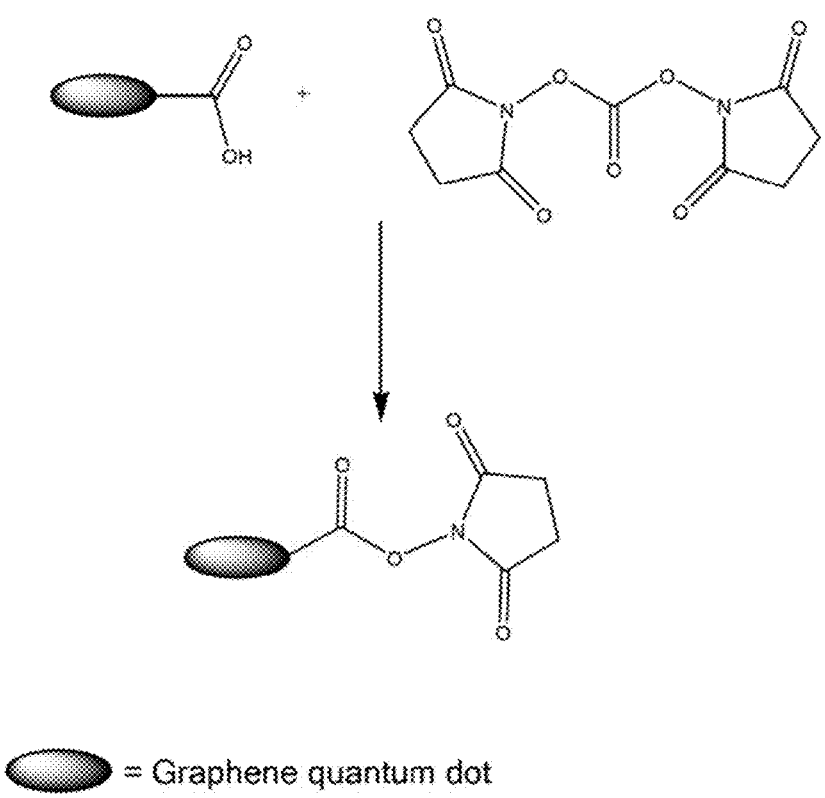
FIGS. 1A and 1B illustrate alternative synthetic schemes for compositions of the invention.

In an embodiment, the invention provides a compound or polymer covalently bonded to a graphene quantum dot, wherein the compound or polymer is an industrial water source treatment compound or polymer. Such covalently bonded graphene quantum dots are referred to herein as "tagged compounds" or "tagged polymers" respectively. In some embodiments, the invention further provides a tagged composition that comprises an industrial water source treatment compound combined with a tagged compound, wherein the tagged compound comprises a residue of the industrial water source treatment compound. In some embodiments, the invention further provides a tagged composition that comprises an industrial water source treatment polymer combined with a tagged polymer, wherein the tagged polymer comprises a residue of the industrial water source treatment polymer. In some embodiments, the tagged compositions of the invention further include one or more solvents, surfactants, polymers, or other additives.

In embodiments, the water treatment composition of the invention comprises a tagged compound comprising a graphene quantum dot covalently bonded to a water treatment compound. In embodiments, the water treatment composition of the invention comprises a tagged polymer comprising at least one graphene quantum dot covalently bonded to a water treatment polymer. In embodiments, the water treatment composition of the invention comprises a mixture of a tagged compound and a water treatment compound. In embodiments, the water treatment composition of the invention comprises a mixture of a tagged polymer and a water treatment polymer.

In another embodiment, the invention provides a method of treating an industrial water source comprising dosing the water source with a treatment comprising at least one fluorescent tagged compound to create a treated water source, measuring fluorescence of the treated water source, and optionally adjusting dosing of the water source based on the measured fluorescence.

In another embodiment, the invention provides a method of treating an industrial water source comprising dosing the water source with a treatment comprising at least one fluorescent tagged polymer to create a treated water source, measuring fluorescence of the treated water source, and optionally adjusting dosing of the water source based on the measured fluorescence.

These and other features and advantages of the present invention will be apparent from the following detailed description, in conjunction with the appended claims.

DETAILED DESCRIPTION OF THE INVENTION

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "water source" means water comprising one or more targeted materials therein, wherein the one or more targeted materials are desirably separated from, passivated, or entrained within the water. In embodiments, the water sources addressed herein are industrial water sources, that is, water having one or more targeted materials therein as a result of one or more industrial processes. As used herein, the term "separated" means phase separated such as accomplished by precipitation, flocculation, liquid-liquid phase separation, and the like. As used herein, the term "passivated" means that a deleterious effect of a targeted material is neutralized, negated, or diminished. As used herein, the term "entrained" means dissolved, dispersed, or emulsified. Industrial water sources include produced water emanating from hydrocarbon reservoirs or mines, recycled water used for cooling in industrial manufacturing processes, wastewater generated by one or more industrial processes such as papermaking or food processing, and other water sources generated by industrial processes.

As used herein, the term "produced water" means water that flows back from a subterranean reservoir. In some embodiments the produced water is collected after bulk separation of water and hydrocarbon obtained in a hydrocarbon recovery process including, but not limited to hydraulic fracturing and tertiary oil recovery. In such embodiments, the produced water includes between 0.001 wt % and 99 wt % hydrocarbon products entrained therein and one or more of injectate, connate (native water present in the subterranean formation along with the hydrocarbon), brackish water, and sea water. In other embodiments, "produced water" means water that flows back from a subterranean mining operation.

As used herein, the term "hydrocarbon" means liquid or solid compounds composed substantially of carbon and hydrogen and including one or more of linear, branched, or cyclic alkanes, alkenes, or alkynes; aromatic and alkaromatic compounds, and polymerized products thereof. The term hydrocarbon is used herein to indicate petroleum products entrained in a water source or capable of being entrained. In some embodiments hydrocarbon is entrained in a water source after bulk separation of the aqueous and hydrocarbon phases recovered in one or more subterranean hydrocarbon recovery processes. Such processes include but are not limited to hydraulic fracturing and tertiary oil recovery. In some embodiments hydrocarbon is entrained in a water source after one or more industrial processes wherein the water is employed as a cooling agent. Thus, for example, recycled water employed in an ethylene cracker system as a coolant for pyrolyzed hydrocarbon sources is contacted with hydrocarbon byproducts of the pyrolysis and some of these byproducts become entrained in the water source. Other examples of hydrocarbon becoming entrained in one or more water sources are easily envisioned by one of skill.

As used herein, the term "targeted material" means one or more materials dissolved, emulsified, or dispersed in an industrial water source that are treated by one or more industrial water treatment compounds and methods. Exemplary but non-limiting examples of targeted materials and corresponding water treatment compounds and/or methods include corrosive compounds targeted for an anti-corrosion treatment; compounds that tend to phase separate from water and deposit onto equipment surfaces, targeted for prevention of phase separation or prevention of deposition/precipitation; emulsified hydrocarbon compounds targeted for resolution (breaking) of the emulsion; microbes targeted for antimicrobial treatment; and dispersed solids targeted for coagulation or flocculation.

As used herein, the term "treat" "treating" "treatment" or "treatment method", further referring to treatment of a water source, refers to a process carried out to separate a targeted material from an industrial water source, passivate a targeted material within an industrial water source, or entrain a targeted material within an industrial water source. Exemplary but nonlimiting examples of treatments include anti-corrosion treatments to passivate metal surfaces from corrodents present in an industrial water source, emulsion breaking treatments to cause liquid-liquid phase separation of a targeted material from the industrial water source, anti-scale treatments to prevent deposition of calcium scale on surfaces contacted by industrial water sources, antifreeze treatments to prevent solidification of or to prevent phase separation of an industrial water source in environments wherein the temperature is or may be near or below 0° C., paraffin inhibition treatments to prevent deposition of waxy petroleum-based solids on surfaces contacted by industrial water sources carrying hydrocarbons, flocculation/coagulation treatments to remove solid impurities from industrial water sources by precipitation, disinfection/sterilization treatments to neutralize or reduce microbial agents present in industrial water sources, purification treatments to remove various targeted materials from industrial water sources, polymerization inhibition treatments to reduce or prevent polymerization of hydrocarbon impurities present in industrial water sources, and the like.

As used herein, the term "treatment compound" a compound added to one or more water sources to treat a targeted material. The treatment compound is polymeric or nonpolymeric, as determined by the type of treatment and treatment methods employed. Treatment compounds include pH adjustment agents, antifreeze agents, corrosion inhibitors, purifiers, softeners, paraffin inhibitors, antiscale agents, biocides, fungicides, stabilizers, emulsifiers, hydrotropes, emulsion breakers, antifouling compounds, coagulants, flocculants, chelating agents, surfactants, oxygen scavengers, rheology control agents, surfactants, defoamers, foam inhibitors, hydrate inhibitors, dispersants, asphaltene inhibitors, sulfide inhibitors, and the like. In some embodiments, the treatment compound is a treatment polymer, wherein the term "polymer" means a compound comprising 3 or more covalently bonded residues of one or more a, 13 unsaturated compounds.

As used herein, the terms "fluorophore" and "graphene quantum dot" (GQD) mean a graphene particulate having a particle size of about 1 nm to 20 nm in a direction. Graphene particulates are characterized as substantially two-dimensional crystalline structures; thus, the particle size refers to an edge-to-edge distance of the particle and not to e.g. particle diameter. Where recited, "average particle size" means an average particle size of a graphene quantum dot or a fluorescent treatment compound as determined by Dynamic Light Scattering (DLS), Transmission electron microscopy (TEM) and/or ellipsometry techniques, or an average thereof including averages of any two or more thereof, as determined by context.

As used herein, the term "fluorescent treatment compound" means a GQD covalently bonded to the residue of a treatment compound. In some embodiments, the fluorescent treatment compound is a fluorescent treatment polymer.

As used herein, the term "fluorescent treatment composition" means a treatment compound combined with a fluorescent treatment compound, wherein the fluorescent treatment compound comprises a fluorophore covalently bonded to the a residue of the treatment compound.

As used herein, the terms "spectrometry" and "spectroscopy" means the process of analyzing the interaction between a sample of matter and electromagnetic radiation to determine one or more physical properties of the sample of matter. Forms of electromagnetic radiation used include but are not limited to one or more of microwave, terawave, infrared, near infrared, visible, ultraviolet, x-ray, radiation. The analysis includes measurements of one or more of the radiation's absorption, emission, fluorescence, colorometrics, color changes, reflection, scattering, impedance, refraction, and resonance by the sample of matter.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, rate, concentration, partition coefficient, solubility, temperature, and the like; intended values include yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

DISCUSSION

A particulate fluorophore is covalently bonded to one or more treatment compounds to provide fluorescent treatment compounds. The fluorescent treatment compounds thus include a particulate fluorophore covalently bonded to the residue of a treatment compound. In some embodiments, the fluorescent treatment compound is a fluorescent treatment polymer. The fluorescent treatment compounds are useful to treat industrial water sources. In some embodiments, a treatment compound is combined with a fluorescent treatment compound comprising the residue of the treatment compound to provide a fluorescent treatment composition. The fluorescent treatment compounds and fluorescent treatment compositions are advantageously employed to treat one or more industrial water sources. The fluorescent treatment compounds and compositions can be used to monitor and optionally control dosage of the treatment compound or residue thereof in the industrial water source.

In embodiments, the fluorescence emission wavelength of a fluorescent treatment compound does not overlap with the background fluorescence emission wavelength of one or more materials entrained in the industrial water source.

Fluorescent Treatment Compounds

In embodiments, a composition of the invention comprises, consists essentially of, or consists of one or more fluorescent treatment compounds. A fluorescent treatment compound comprises, consists essentially of, or consists of a treatment compound covalently bonded to a fluorophore. The fluorophore comprises, consists essentially of, or consists of a graphene quantum dot. In some embodiments, a fluorescent treatment composition is further formed by combining a treatment compound with a fluorescent treatment compound having a residue of the treatment compound covalently bonded thereto. The fluorescent treatment compounds produce fluorescence at excitation wavelengths (i.e. $\lambda_{max}$), emission wavelengths, or both that are substantially non-overlapping with characteristic $\lambda_{max}$ or emission wavelengths of many materials present in industrial water sources, thereby enabling monitoring and tracing of fluorescent treatment compound concentration within an industrial water source in real time and without interference from extraneous fluorescence. Where a fluorescent treatment composition is employed instead of the fluorescent treatment compound alone, the fluorescent treatment compound presence enables the monitoring of concentration of the treatment compound in the industrial water source in real time.

A quantum dot is a nanometer-scale particle where excitons are confined in all three spatial dimensions. Graphene quantum dots, or "GQD" are graphene fragments that are small enough to cause exciton confinement and a quantum size effect. Typically, GQD have diameters of less than about 20 nm. Due to the fact that all graphene fragments exhibit quantum confinement effects, GQD have a non-zero bandgap and luminesce upon excitation. The bandgap is tunable by modifying the size and surface chemistry of the GQD. Overall, the spectroscopic properties of GQD vary depending on the method of preparation and/or functional groups bonded to the GQD at the edge(s) of the particles, and the size of the GQD.

The GQD useful in embodiments of the invention to form fluorescent treatment compounds include those having an average particle size of about 1 nm to 20 nm, or about 2 nm to 20 nm, or about 3 nm to 20 nm, or about 4 nm to 20 nm, or about 1 nm to 18 nm, or about 1 nm to 16 nm, or about 1 nm to 14 nm, or about 1 nm to 12 nm, or about 1 nm to 10 nm, or about 1 nm to 8 nm, or about 1 nm to 6 nm, or about 1 nm to 4 nm, or about 2 nm to 10 nm, or about 2 nm to 8 nm, or about 2 nm to 6 nm, or about 2 nm to 5 nm, or about 2 nm to 4 nm, or about 3 nm to 5 nm, wherein "particle size" refers to an average edge-to-edge distance of the substantially two-dimensional GQD, further as measured using Dynamic Light Scattering (DLS), Transmission electron microscopy (TEM) or ellipsometry. While GQD are often characterized as a single thickness of a graphene sheet, in fact in some embodiments and depending on the preparatory method used the GQD can be up to about 5 graphene layers thick. Results obtained from X-ray diffraction, Raman spectroscopy, and high resolution transmission electron microscopy demonstrate the GQD have a crystalline structure similar to that of graphene. The shape of most GQD is circular or elliptical, but triangular, quadrate and hexagonal GQD are known as well and are also useful in various embodiments as fluorophores in forming a composition of the invention.

The GQD useful in the compositions and methods of the invention are made by either a "top down" or "bottom up" approach, as will be appreciated by one of skill. Top-down methods involve the decomposition and exfoliation of inexpensive, readily available bulk graphene-based materials, most commonly graphite, but require harsh conditions and often further require multiple steps involving concentrated acids, strong oxidizing agents, and high temperatures. A commonly employed top-down synthesis is called the Hummers method and involves exfoliation of graphite nanoparticles to form GQD. Bottom-up methods involve synthesis from polycyclic aromatic compounds or other molecules with aromatic structures such as fullerenes. Although complex, these methods allow for superior control of the properties and morphology of the final product compared to the top-down methods.

In some of the methods known for forming GQD, functional groups are added at the edge of the two-dimensional carbon "sheet" either inherently as part of the synthesis, or as a result of an extra step for this purpose. For example, Pan et al., *Adv. Mater.* 2010, 22, 734 employ hydrothermal cutting methodology involving an oxidation step in acidic conditions to result in development of epoxy moieties within a two-dimensional graphene sheet that ultimately are the sites of graphene sheet scission. The epoxy groups are further oxidized and yield carbonyl functionality at one or more sites present at the edges of the GQD formed by the scission process.

Other techniques to form functionalized GQD are known. Some representative currently known methods of GQD functionalization are discussed in Bacon, M. et al., *Part. Part. Syst. Charact.* 2014, 31, 415-428. GQD useful in the invention are functionalized either during or after synthesis of the GQD. Useful herein are GQD "edge-functionalized" with carboxyl, hydroxyl, thiol, or amino functionality. At the time of this writing, carboxyl-functional GQDs are the most commonly available functionalized GQD. However, as techniques for edge-functionalized GQD are developed, Applicant expects additional options for covalently bonding treatment compounds to GQD to become available. In this spirit, Applicant considers additional functionalized GQD to fall within the scope of this disclosure as being equivalents of the presently disclosed GQD-based structures.

An advantage of the present invention is that the GQD fluorophore is highly compatible with water and disperses spontaneously therein. Thus, the dispersibility and compatibility of the GQD in industrial water sources is good. Additional attractive features or properties of GQD include the abundance of starting materials for synthesis thereof, non-toxicity of GQD, ease of preparation of GQD without relying on toxic precursors, excellent compatibility of GQD with aqueous media, the availability of edge-functionalized GQD for covalently bonding one or more treatment compounds thereto, and the ability to control $\lambda_{MAX}$ of the GQD by selecting the particle size of the GQD. In many of these features or properties, GQD are preferable to organic-based fluorescent "tagging" compounds that are not environmentally friendly, and in some cases are insoluble in or are incompatible with aqueous compositions.

Figure 1B:
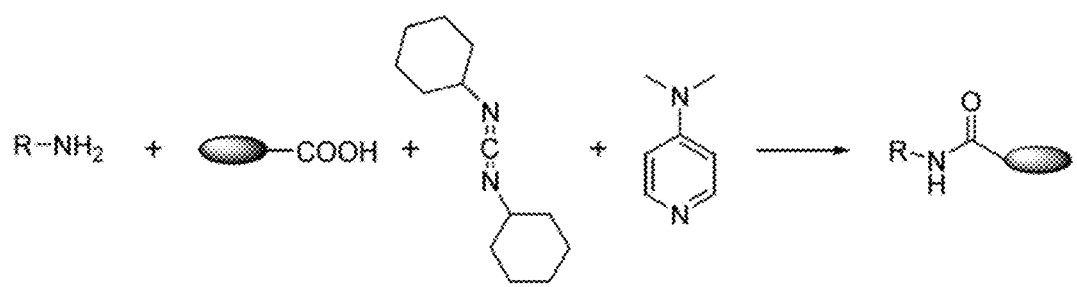

One or more treatment compounds are covalently bonded to one or more GQD by employing the "edge functionality" imparted thereto as discussed above, to result in one or more fluorescent treatment compounds. For example, a carboxy-functional GQD, termed "GQD-COOH" herein, is exemplary in demonstrating how covalent bonding to form a fluorescent treatment compound is accomplished. FIG. 1A shows one example of an "activating" reaction that is optionally employed to form an activating moiety on the GQD-COOH by reacting with the —COOH functionality to form an activated GQD, also termed "GQD*" herein. In the case of FIG. 1A, a succinimide group is bonded to the COOH moiety, wherein the succinimide group is a good leaving group and the succinimide functionalized GQD is a GQD*. FIG. 1B shows another example of an "activating" reaction that is optionally employed to form an activating moiety on the GQD-COOH by reacting with the —COOH functionality to form a "GQD*" herein. In the case of FIG. 1B, the GQD* is formed as an intermediate that then proceeds to the final product during the course of a single-pot reaction. Thus, in FIG. 1B, N,N-dicyclohexylcarbodiimide (DCC) and a tertiary amine such as 4-dimethylaminopyridine (DMAP) are combined with GQD-COOH and an amino-functional group, R—$NH_2$, wherein R includes the functionality to be bonded to the GQD. The result of the reaction is the formation of a fluorescent treatment compound, R—NH—C(O)-GQD, wherein GQD* is a chemical intermediate that is formed but not isolated from the single-pot reaction. Other such activating (leaving) groups will be readily envisioned and reactions to form such GQD* will also be readily envisioned, as will be appreciated by one of skill.

An "activated GQD" is a fluorophore functionalized with a group capable of leaving readily under a broad range of conditions in favor of a treatment compound functionality or functionality capable of forming a covalent bond with the GQD*. A treatment compound, or molecule capable of forming a treatment compound, is reacted with the GQD-COOH or GQD* to result in a covalent bond between the GQD and a functionality present on the treatment compound or precursor of a treatment compound. In some embodiments, such as in FIG. 1B, the GQD* is a reactive intermediate in a single-pot reaction and goes on to form the fluorescent treatment compound without further manipulation. In other embodiments, such as in FIG. 1A, the intermediate is optionally isolated or stored until one or more additional reactions are further carried out to form the fluorescent treatment compound. In some embodiments, a reactive functionality present on the treatment compound or precursor thereof is directly reacted with the GQD-COOH or GQD* to result in a fluorescent treatment compound.

Figure 2A:
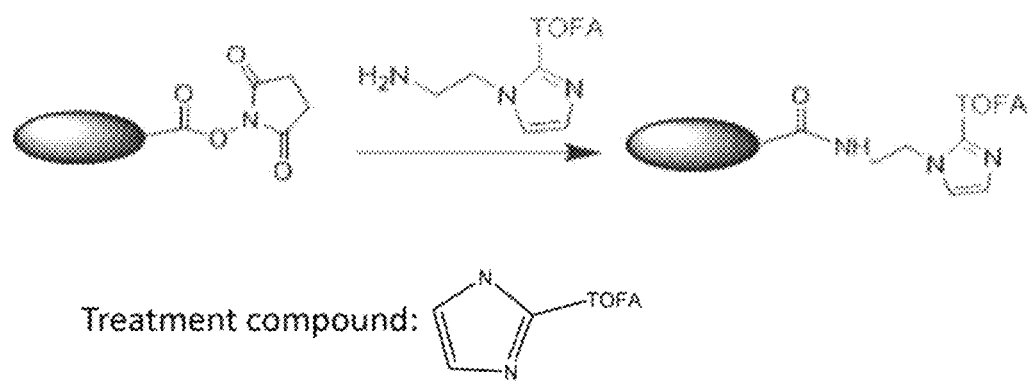
FIGS. 2A and 2B illustrate alternative synthetic schemes for a composition of the invention.

Building on the reaction scheme involving the succinimide activation of the GQD to form a GQD*, FIG. 2A is a reaction scheme showing a GQD* reacted with an amino-functional compound known to be a corrosion inhibitor (CI). The CI is a 1,3-diazole adduct (an imidazoline) of tall oil fatty acid (TOFA=tall oil fatty acid) bonded thereto. The adduct is commonly referred to as "TOFA/DETA", or alternatively by one or more similar terms of art such as "TOFA-DETA", "TOFA DETA", "TOFA/DETA imidazoline", "TOFA DETA imidazoline" or TOFA-DETA imidazoline". The TOFA/DETA adduct is further reacted with a carboxylic acid-functional GQD* to form GQD-t-TOFA/DETA, or "TOFA/DETA-GQD". The 2-aminoethyl moiety of TOFA/DETA is capable of displacing the succinimide group of the GQD* to result in this GQD-t-CI. The GQD-t-TOFA/DETA therefore includes a carboxamide group disposed between and bonded to both the GQD and the residue of the CI. The fluorescent treatment compound of FIG. 2A therefore includes a carboxamide group disposed between and bonded to both the GQD and the residue of the CI. The TOFA group is one example of a fatty acid residue that is present on the CI residue; other fatty acids having linear, branched, or unsaturated hydrocarbon chains of 8 and 24 carbons are similarly useful as CI residues in the fluorescent treatment compound.

Figure 2B:
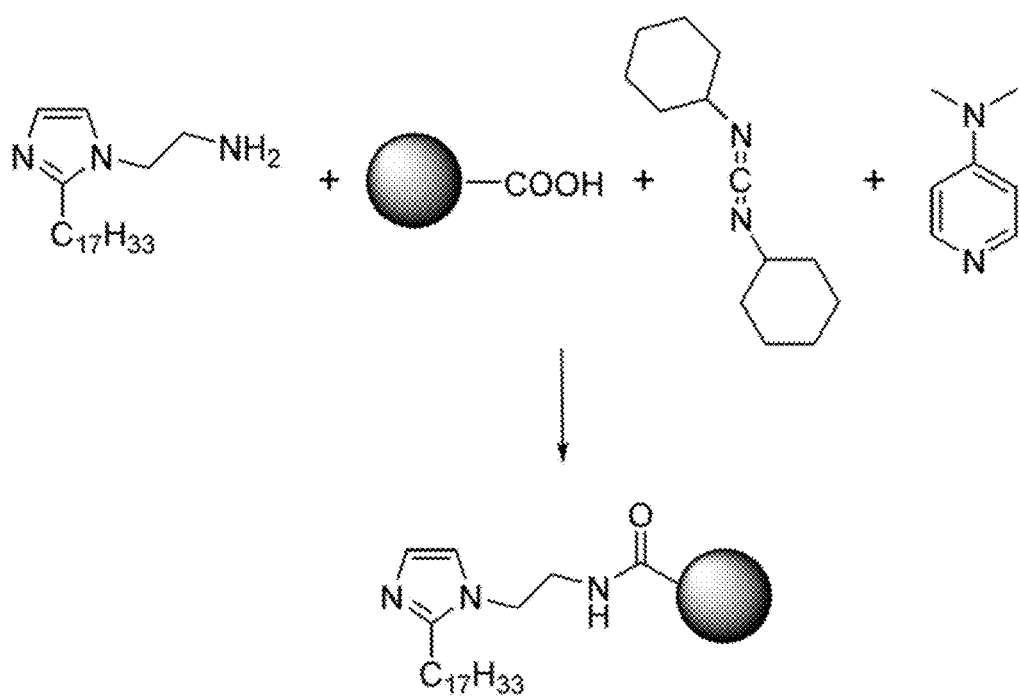

FIG. 2B shows an alternative reaction scheme, wherein the CI functionality is bonded to the GQD by reacting an acid functional GQD directly with the TOFA adduct (here represented as a C17 group) by combining the components in the presence of DCC (dicyclohexylcarbodiimide) and a tertiary amine to lead directly to the functionalized GQD.

Figure 3:
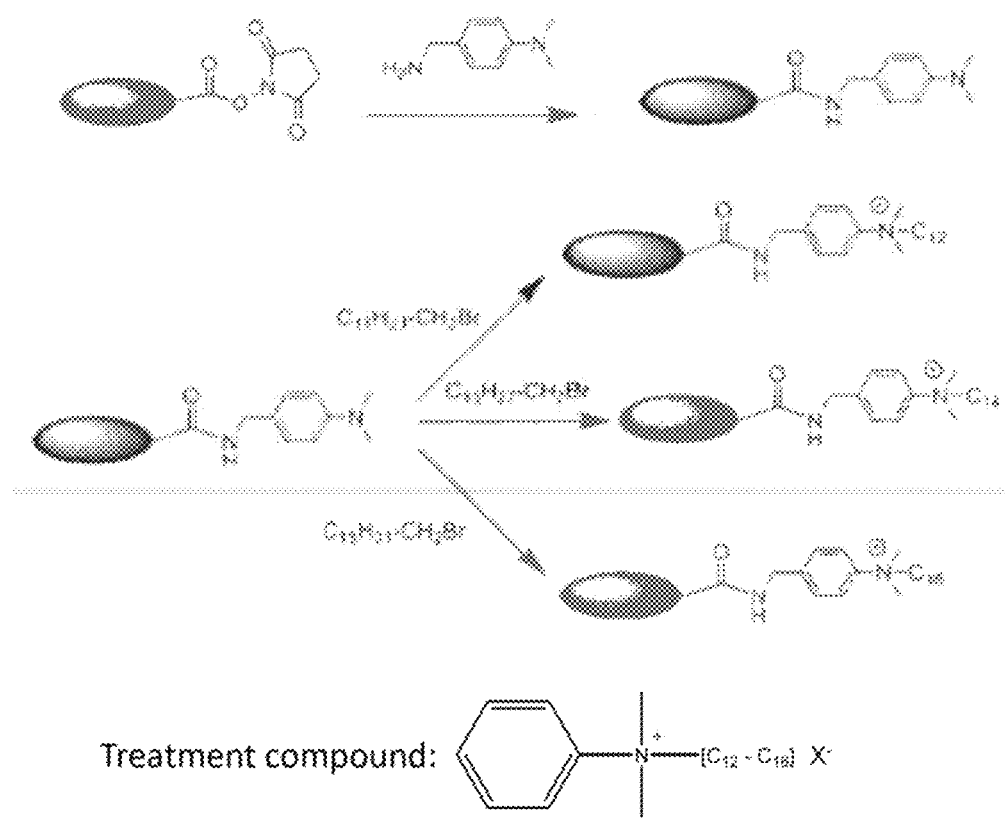
FIG. 3 illustrates a synthetic scheme for another composition of the invention.

In some embodiments, the formation of a fluorescent treatment material involves forming a covalent bond between a GQD and a precursor of a treatment compound. One example of this approach is shown in FIG. 3. As shown in FIG. 3 a GQD* is reacted with an aminomethyl N,N-dimethylaniline compound to form an precursor fluorescent compound. In the embodiment shown, the precursor fluorescent compound includes a carboxamide group disposed between and bonded to both the GQD and the residue of a precursor. In a second step also depicted in FIG. 3, the dimethylamino group is further reacted with a $C_{12}$, $C_{14}$, or $C_{16}$ alkyl bromide to yield the corresponding ammonium bromide bonded to the GQD via the carboxamide linkage. The ammonium-functional compounds thus formed are fluorescent treatment compounds. Specifically, the fluorescent treatment compounds of FIG. 3 are fluorescent corrosion inhibitor compounds. The fluorescent treatment compounds are suitably employed alone or in a fluorescent treatment composition when combined with a corrosion inhibitor compound having substantially the same structure as the residue of the corrosion inhibitor compound bonded to the GQD.

Figure 4:
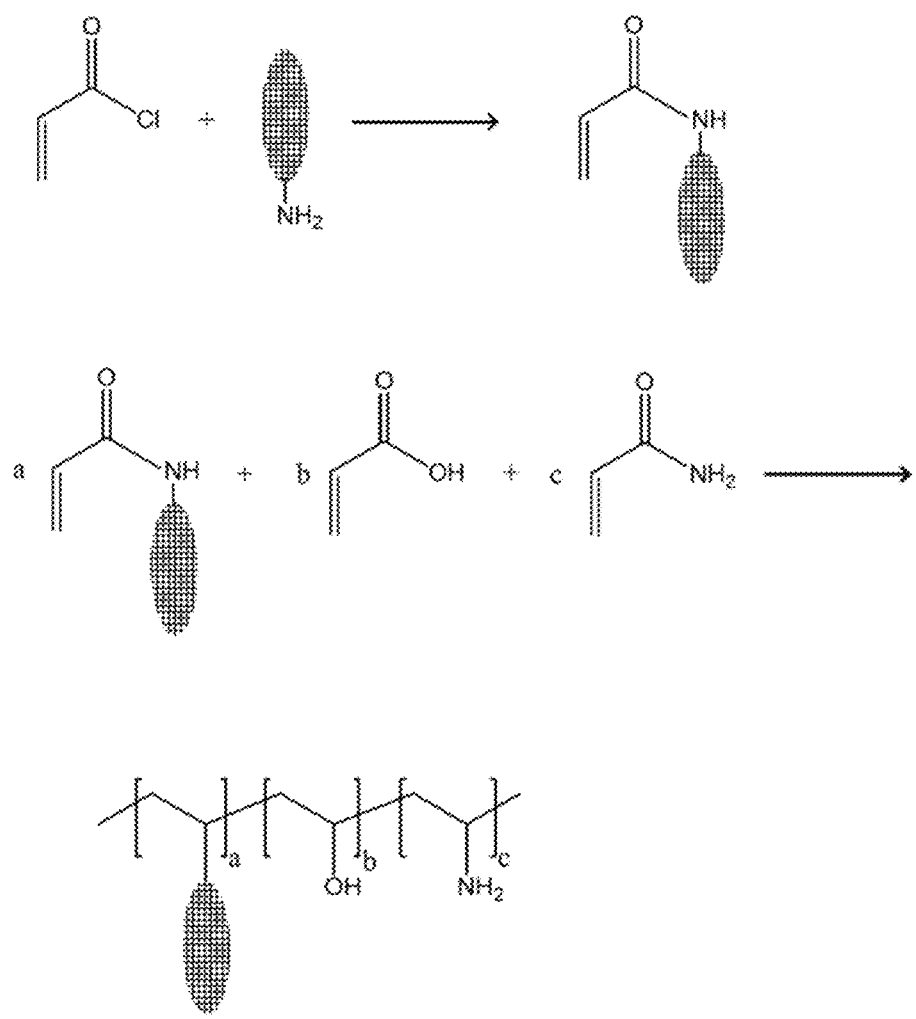
FIG. 4 illustrates a synthetic scheme for another composition of the invention.

FIG. 4 shows another example of synthesis of a fluorescent treatment compound starting with synthesis of a fluorescent precursor compound, following by reaction of the precursor to form the fluorescent treatment compound. In the embodiment shown in FIG. 4, the fluorescent treatment compound is a fluorescent treatment polymer, wherein the GQD is first covalently bonded to a monomeric compound to yield a fluorescent precursor compound; the fluorescent precursor compound is then polymerized in the presence of one or more non-GQD functionalized vinylic monomers to form a fluorescent treatment compound. In this and other related embodiments, the fluorescent treatment compound is a fluorescent treatment polymer. In embodiments, the fluorescent treatment polymer is a homopolymer, copolymer, terpolymer, quaterpolymer, or higher ordered interpolymer containing one, two, three, four, or more residues of a, (3-unsaturated monomers, wherein at least one such residue includes a GQD covalently bonded thereto. In some embodiments, GQD are covalently bonded to a treatment polymer to result in a fluorescent treatment polymer, while in other embodiments GQD are bonded to a fluorescent monomer followed by polymerization optionally with one or more additional monomers as described above to form a fluorescent treatment polymer.

Further exemplified in FIG. 4 is another aspect of the invention: in some embodiments, it is not necessary to form a GQD*; in such embodiments the edge-functionalized GQD is employed without an intermediate or activating step. Thus, in FIG. 4, an amine-functionalized GQD formed by hydrothermal treatment of a GQD in ammonia (as reported e.g. by Sun, H. et al., *Chemistry a European Journal*, 19(4), 2013, 13362-13368) is employed in a reaction with acrylyl chloride to yield a GQD-functionalized acrylamide monomer. Acrylamide is a precursor for a tertiary oil recovery polymer, which is a copolymer of acrylamide and acrylic acid. After formation of the fluorescent precursor compound from the GQD and acrylyl chloride, the copolymer or terpolymer thereof with acrylamide and/or acrylic acid is formed, which is the fluorescent treatment polymer.

In embodiments, the fluorescent treatment compound of FIG. 4 is the product of a copolymerization of the fluorescent precursor compound with one or more vinylic monomers wherein incorporation of the fluorescent precursor compound into the resulting copolymer chain is observed to occur. In embodiments, the polymerization is carried out in water or an aqueous solution, dispersion, or emulsion such as a water-in-oil emulsion. In such embodiments, it is a feature of the methods of the invention that all or substantially all of the fluorescent precursor compound is incorporated in such copolymers wherein one or more vinylic monomers are water soluble. Copolymerization reactions are governed by relative reactivity of the monomers in the reaction; reactivity is in part a function of solubility or compatibility of the monomer(s) in the reaction environment. While not wishing to be bound by any particular theory, we believe that the quantitative or substantially quantitative incorporation of the fluorescent precursor compounds into such copolymer chains is due in part to the excellent water compatibility properties of the GQD and fluorescent precursor monomer compounds, resulting in increased proximity to the growing radical on the polymer chain.

The number of vinylic monomers copolymerized with one or more fluorescent precursor compounds is not particularly limited except by the intended use, as will be appreciated by one of skill. In embodiments, the fluorescent precursor compounds copolymerize with one or more vinylic monomers to result in an incorporation percentage of from about 90 mol % to about >99 mol % of the fluorescent precursor compound. Thus, in some embodiments, a fluorescent precursor monomer compound copolymerizes with one or more vinylic monomers in an incorporation percentage of from about 90 mol % to about >99 mol %, from about 95 mol % to about >99 mol %, from about 96 mol % to about >99 mol %, from about 97 mol % to about >99 mol %, or from about 98 mol % to about >99 mol %.

In various embodiments, vinylic monomers functionalized with GQD to provide fluorescent precursor compounds and/or vinylic monomers copolymerized with one or more fluorescent precursor compounds may be nonionic, anionic, or cationic as well as mixtures of such compounds and including compounds such as zwitterionic compounds. Polymers formed from vinylic monomers are, in embodiments, prepared via free radical polymerization in an aqueous solution using a free radical initiator. In some such embodiments, a fluorescent precursor compound undergoes free radical polymerization with one or more vinylic monomers in the presence of a free-radical source, such as a thermally decomposing azo-initiator. Representative nonionic, water-soluble monomers advantageously copolymerized with one or more fluorescent precursor compounds include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-tert-butylacrylamide, N-methylolacrylamide, and the like as well as zwitterionic monomers such as α-olefin, acrylate, or methacrylate functional sulfotaine and betaine compounds such as e.g. 3-[[2-(methacryloyloxy)ethyl]dimethylammonio]propionate.

Representative anionic monomers advantageously copolymerized with one or more fluorescent precursor compounds include acrylic acid and its salts, including, but not limited to sodium acrylate, and ammonium acrylate, methacrylic acid, and its salts, including, but not limited to sodium methacrylate, and ammonium methacrylate, 2-acrylamido-2-methylpropanesulfonic acid, the sodium salt of AMPS, sodium vinyl sulfonate, styrene sulfonate, maleic acid, and its salts, including, but not limited to the sodium salt, and ammonium salt, sulfonate itaconate, sulfopropyl acrylate or methacrylate or other water-soluble forms of these or other polymerizable carboxylic or sulphonic acids; sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

Representative cationic monomers advantageously copolymerized with one or more fluorescent precursor compounds include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminoethyl acrylate methyl chloride quaternary salt, dimethylaminoethyl acrylate benzyl chloride quaternary salt, dimethylaminoethyl methacrylate methyl chloride quaternary salt, dimethylaminoethyl methacrylate benzyl chloride quaternary salt, methacrylarnidopropyl trimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, diallyldimethylammonium chloride, and the like.

In embodiments, the fluorescent treatment polymer is a linear polymer, a crosslinked polymer, a branched polymer, a hyperbranched polymer, a dendritic polymer, or a combination of two or more thereof. In some such embodiments the fluorescent treatment polymer is structurally modified during synthesis to increase branching, incorporated crosslinking, or limit ultimate molecular weight of the polymer by including a structural modifier such as a crosslinking agent or a chain transfer agent in the reagents employed in a polymerization reaction to yield a final fluorescent treatment polymer product specified for use in one or more industrial water sources.

In embodiments, the fluorescent treatment polymers comprise one or more GQD species bonded thereto in a selected amount. In some embodiments, a fluorescent treatment polymer comprises one or more GQD covalently bonded thereto in an amount of from about 0.0001 wt % to about 5 wt %, based on the weight of the fluorescent treatment polymer. Thus, in embodiments, the polymeric fluorescent treatment compounds comprises one or more GQD covalently bonded thereto an amount of from about 0.0001 wt % to about 5 wt %, from about 0.0001 wt % to about 4 wt %, from about 0.0001 wt % to about 3 wt %, from about 0.0001 wt % to about 2 wt %, from about 0.0001 wt % to about 1 wt %, from about 0.0001 wt % to about 0.5 wt %, from about 0.0001 wt % to about 0.1 wt %, from about 0.0001 wt % to about 0.01 wt %, from about 0.001 wt % to about 5 wt %, from about 0.001 wt % to about 4 wt %, from about 0.001 wt % to about 3 wt %, from about 0.001 wt % to about 2 wt %, from about 0.001 wt % to about 1 wt %, from about 0.001 wt % to about 0.5 wt %, from about 0.001 wt % to about 0.1 wt %, from about 0.001 wt % to about 0.01 wt %, from about 0.01 wt % to about 5 wt %, from about 0.01 wt % to about 4 wt %, from about 0.01 wt % to about 3 wt %, from about 0.01 wt % to about 2 wt %, from about 0.01 wt % to about 1 wt %, from about 0.01 wt % to about 0.5 wt %, from about 0.01 wt % to about 0.1 wt %, from about 0.05 wt % to about 5 wt %, from about 0.05 wt % to about 4 wt %, from about 0.05 wt % to about 3 wt %, from about 0.05 wt % to about 2 wt %, from about 0.05 wt % to about 1 wt %, or from about 0.1 wt % to about 5 wt %, based on the weight of the fluorescent treatment polymer.

The molecular weight of the fluorescent treatment polymer is not limited. In certain preferred embodiments, the fluorescent treatment polymer has a molecular weight of from about 550 Daltons to about 50 million Daltons, or from about 10,000 Daltons to about 1,000,000 Daltons, from about 1,000 Daltons to about 50 million Daltons, from about 10,000 Daltons to about 50 million Daltons, from about 100,000 Daltons to about 50 million Daltons, from about 550 Daltons to about 10,000,000 Daltons, from about 1,000 Daltons to about 10,000,000 Daltons, from about 10,000 Daltons to about 10,000,000 Daltons, from about 100,000 Daltons to about 10,000,000 Daltons, from about 1,000,000 Daltons to about 10,000,000 Daltons, from about 550 Daltons to about 1,000,000 Daltons, from about 1,000 Daltons to about 1,000,000 Daltons, from about 10,000 Daltons to about 1,000,000 Daltons, from about 100,000 Daltons to about 1,000,000 Daltons, from about 1,000 Daltons to about 100,000 Daltons, from about 10,000 Daltons to about 100,000 Daltons, from about 550 Daltons to about 50,000 Daltons, from about 1,000 Daltons to about 50,000 Daltons, or from about 10,000 Daltons to about 50,000 Daltons.

Fluorescent Treatment Compositions

The fluorescent treatment compounds, including fluorescent treatment polymers, are employed alone or in a fluorescent treatment composition. As used herein, the term "fluorescent treatment composition" means a treatment compound combined with a fluorescent treatment compound, wherein the fluorescent treatment compound comprises a GQD covalently bonded to a residue of the treatment compound. Where the fluorescent treatment compound is a fluorescent treatment polymer, the term "a residue of the treatment compound" means the residue of a treatment polymer including substantially the same monomeric residue content, substantially the same molecular weight, or both substantially the same monomeric residue content and substantially the same molecular weight as the treatment polymer.

As used herein, the term "treatment compound" or "water treatment compound" means a compound added to one or more industrial water sources to provide an intended treatment thereof. The treatment compound is polymeric or nonpolymeric, as determined by the particular type of intended treatment and treatment methodology employed. As defined by use, treatment compounds include pH adjustment agents, antifreeze agents, corrosion inhibitors, purifiers, softeners, paraffin inhibitors, antiscale agents, biocides, fungicides, stabilizers, emulsifiers, hydrotropes, emulsion breakers, antifouling compounds, coagulants, flocculants, chelating agents, surfactants, oxygen scavengers, rheology control agents, surfactants, defoamers, foam inhibitors, hydrate inhibitors, dispersants, asphaltene inhibitors, sulfide inhibitors, and the like.

The treatment compounds usefully combined with one or more fluorescent treatment compounds to form the fluorescent treatment compositions include, but are not limited to, the following.

Corrosion Inhibitor Compounds.

Corrosion inhibitors include, but are not limited to, mercaptoethanol, thioglycolic acid, sodium thiosulfate, imidazolines functionalized with fatty acid groups, alkylated cyclic amines such as imidazolines, triazoles, pyridines, pyrimidines, triazines, and the like, quaternary ammonium adducts of alkyl, aromatic, or mixed alkyl and aromatic hydrocarbons, phosphate esters of polyethylene oxide and the like. A corrosion inhibitor is selected for reaction with one or more GQD or GQD* to form the corresponding fluorescent corrosion inhibitor, wherein the fluorescent corrosion inhibitor is mixed with the corrosion inhibitor to form a fluorescent corrosion inhibitor composition.

Paraffin Inhibitor Compounds.

Paraffin inhibitors are polymeric compounds including, but not limited to, ethylene-vinyl acetate copolymers, alkylphenol-formaldehyde copolymers, acrylate and/or methacrylate (co)polymers, and copolymers comprising the residues of one or more alpha olefin monomers and a maleic anhydride monomer, the one or more alpha olefin monomers having the formula (I):

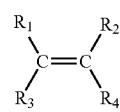
(I)

wherein $R_1$, $R_2$, $R_3$, and $R_4$ are independently selected from hydrogen and $C_5$-$C_{60}$ alkyl, with the proviso that at least two thereof are hydrogen; the alkyl maleic anhydride monomer having the formula (II):

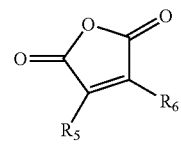
(II)

wherein $R_5$ and $R_6$ are independently selected from hydrogen or $C_1$-$C_{30}$ alkyl. In some embodiments, the maleic anhydride residue is further reacted with about 0.01 to 2.0 equivalents of a $C_{12}$-$C_{60}$ alkanol or amine per equivalent of anhydride.

Antiscale Compounds.

Scaling is the term used to describe the hard surface coating of calcium carbonate, magnesium carbonate, and byproducts thereof that forms on metallic surfaces within metal containments carrying industrial water sources with high total dissolved solids, such as produced water, brackish water, sea water, and other sources of divalent carbonates. Antiscale agents include, but are not limited to, oligomeric and polymeric compounds with borate, carboxylate, phosphate, sulfonate, or another anionic moiety.

pH Adjustment Compounds.

Agents employed to adjust pH of one or more industrial water sources include but are not limited to Bronsted acids, conjugate bases and salts thereof and mixtures thereof to provide a selected pH for the industrial water source to be treated. The acids may be strong acids, that is, acids having a pKa of less than about 4; and weak acids, that is, acids having a pKa of about 4 or greater. In some embodiments, organic acids are weak acids. The pH adjustment agents are employed to adjust the pH of the industrial water source to a selected value or range thereof, which may be anywhere from pH of about 1 to 12 depending on the specific treatments to be carried out.

Antifreeze Compounds.

Antifreeze agents include, but are not limited to, compounds that are fully miscible with water and tend to lower the freezing temperature of the resulting mixture to below 0° C. and as low as −60° C. Such compounds include, for example, $C_1$-$C_3$ alkanols, $C_3$-$C_6$ ketones, $C_2$-$C_6$ glycols, water miscible sugar alcohols such as glycerol and erythritol as well as acetylated adducts thereof including triacetin, $C_3$-$C_{10}$ glycol ethers, and mixtures of such compounds.

Emulsion Breaker Compounds.

Emulsion breakers include, but are not limited to, mixtures of one or more surfactants, water miscible solvents, and/or polymers that tend to resolve crude oil phases emulsified in industrial water sources such as are commonly experienced in the recovery of crude oil from subterranean reservoirs when the crude oil product is contacted with e.g. wash water to remove water soluble impurities from the oil. Surfactants and water miscible solvents are described elsewhere herein as treatment compounds. Polymers employed as emulsion breakers include polyalkylene oxide homopolymers and copolymers, polyethyleneimines and functionalized versions thereof, and crosslinked versions of such polymers in addition to other types of non-ionic water dispersible polymers. Other emulsion breaking compounds are cationic oligomers and polymers having quaternary ammonium functionality Antifouling Compounds.

Antifouling compounds include, but are not limited to, copolymers of unsaturated fatty acids, primary diamines, and acrylic acid; copolymers of methacrylamidopropyl trimethylammonium chloride with acrylic acid and/or acrylamide; copolymers of ethylene glycol and propylene glycol; and blends of two or more thereof.

Coagulant Compounds.

Coagulants include, but are not limited to, treatment compounds used in solid-liquid separation stage to neutralize charges of suspended solids/particles so that they can agglomerate. Coagulants are categorized as inorganic coagulants, organic coagulants, and blends of inorganic and organic coagulants. Inorganic coagulants include, but are not limited to, aluminum or iron salts, such as aluminum sulfate/choride, ferric chloride/sulfate, polyaluminum chloride, and/or aluminum chloride hydrate. Organic coagulants include, but are not limited to, positively charged polymeric compounds with low molecular weight, including but not limited to polyamines, polyquaternized polymers, polyDADMAC, Epi-DMA, and coagulants recited in *Kirk-Othmer Encyclopedia of Chemical Technology*, 5th Edition, (2005), (Published by Wiley, John & Sons, Inc.).

Surfactant Compounds.

Surfactants include anionic, nonionic, cationic, and zwitterionic surfactants that reduce the interfacial tension of water when added thereto. The type or use of surfactants is not limited. In some embodiments a surfactant is a polymeric surfactant. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference in their entirety and for all purposes.

Flocculant Compounds.

Flocculants include, but are not limited to, compositions of matter which when added to an industrial water source within which certain particles are thermodynamically inclined to disperse, induces agglomerations of those particles to form as a result of weak physical forces such as surface tension and adsorption. Flocculation often involves the formation of discrete globules of particles aggregated together with films of liquid carrier interposed between the aggregated globules, as used herein flocculation includes those descriptions recited in ASTME 20-85 as well as those recited in *Kirk-Othmer Encyclopedia of Chemical Technology*, 5th Edition, (2005), (Published by Wiley, John & Sons, Inc.), both of which are incorporated herein by reference in their entirety and for all purposes.

Chelating Compounds.

Chelating agents include, but are not limited to, compounds that are effective to reduce or remove one or more metal ions from an industrial water source. Chelation involves the formation or presence of two or more separate coordinate bonds between a polydentate (multiple bonded) ligand and a single central atom. Usually these ligands are organic compounds, and are called chelants, chelators, chelating agents, or sequestering agents.

Antimicrobial Compounds.

Antimicrobials include, but are not limited to, compounds with a microbiostatic, disinfectant, or sterilization effect on the industrial water source when added thereto. Nonlimiting examples of antimicrobials include bactericides, fungicides, nematicides, and the like. Bactericides include active chlorine disinfectants, e.g. including hypochlorites, chlorine dioxide, and the like; phenols such as triclosan, phenol itself, thymol, and the like; cationic surfactants such as quaternary ammonium surfactants, chlorhexidine, and the like; ozone, permanganates, colloidal silver, silver nitrate, copper based compounds, iodine preparations, peroxides, and strong acids and strong alkalis wherein the water source is caused to have a pH of greater than about 12 or less than about 1. Fungicides include, but are not limited to, strobilurins such as azoxystrobin, trifloxystrobin and pyraclostrobin; triazoles and anilino-pyrimidines such as tebuconazole, cyproconazole, triadimefon, pyrimethanil; and additionally compounds such as triadimefon, benomyl, captan, chlorothalonil, copper sulfate, cyproconazole, dodine, flusilazole, flutolanil, fosetyl-al, gallex, mancozeb, metalaxyl, prochloraz, propiconazole, tebuconazole, thiophanate methyl, triadimenol, tridimefon, triphenyltin hydroxide, ziram, and the like.

Hydrate Inhibitors.

Hydrate inhibitors include both kinetic hydrate inhibitors and anti-agglomerants. Kinetic hydrate inhibitors include hydroxyethylcellulose; alkyl glycosides; polymers having N-functional cyclic moieties and/or amide moieties attached to a hydrophobic group present within one or more repeat units thereof, including polyvinyllactams such as polyvinylpyrrolidone and related polymers, amine polyalkoxylates, and polydialkylacrylamides; and combinations of any of the foregoing with synergists including polyelectrolytes, polyether block copolymers, polyalkylacrylamides, and polyalkyloxazolines; quaternary ammonium surfactants, clathrates thereof, and combinations of these with one or more polymers having N-functional cyclic moieties and/or amide moieties attached to a hydrophobic group present within one or more repeat units thereof. Anti-agglomerants include surfactants that provide emulsions of hydrates confined within the water droplets, preventing agglomeration. Exemplary surfactants include diethanolamides, dioctylsulfosuccinates, sorbitans, ethoxylated polyols, ethoxylated fatty acids, ethoxylated amines, and polymeric surfactants based on polyalkenyl succinic anhydride.

Sulfide Inhibitors.

Sulfide inhibitors include aromatic amino compounds known to scavenge hydrogen sulfide gas from one or more waste streams. Compounds such as triazine and related compounds such as HMTA (hexamethylenetetraamine, or 1,3,5,7-tetraazatricyclo[3.3.1.13,7]decane) are useful as sulfide inhibitors.

When the treatment compounds—such as those above—are blended with the corresponding fluorescent treatment compound to form a fluorescent treatment composition, the ratio of fluorescent treatment compound to treatment compound in the composition is about $1:10$ to about $1:1 \times 10^{11}$ by weight. One of skill will appreciate that the ratio of fluorescent to non-fluorescent compounds present in a fluorescent treatment composition is selected based on the type of treatment to be carried out, the amount of the fluorescent treatment composition suitably added, or dosed, to an industrial water source, the quantum yield of fluorescence emission delivered by the GQD, and the excitation wavelength employed in irradiating the GQD as will be discussed in more detail below. In various embodiments, the ratio of fluorescent to non-fluorescent treatment compounds present in a fluorescent treatment composition is selected such that when the composition is applied to an industrial water source in an amount effective to accomplish the intended treatment, the amount of the fluorescent treatment compound applied to the industrial water source is effective to quantify the fluorescent treatment compound at least at one location downstream from the applying. Quantification is accomplished using the methods described below. The amount of the fluorescent treatment compound is selected to provide an effective concentration of GQD in the industrial water source to enable measurement of the concentration thereof based on one or more fluorescent emissions thereof downstream from the applying.

Further, the fluorescent treatment compositions of the invention can include one or more additives or adjuvants that are different from the treatment compound. Additives or adjuvants such as solvents, polymers, surfactants, oils, fillers, buffers, viscosity modifiers, masking agents, colorants, and the like are optionally added to the fluorescent treatment compositions as determined by the operator in conjunction with the specific industrial water source and other variables. Additionally, more than one type or species of treatment compounds, fluorescent treatment compounds, or both are suitably blended in a single fluorescent treatment composition, as determined by the industrial water source, intended treatment, and desirability of measuring the concentration of one or more treatment compounds or fluorescent treatment compounds in the water source downstream from applying the fluorescent treatment composition.

The fluorescent treatment compositions are suitably applied to an industrial water source in any form. In certain embodiments, the fluorescent treatment composition is applied as a solution, emulsion, dispersion, or as the solid composition, wherein "solid" in this context means the treatment composition does not include any additional solvents or other additives to achieve a fluid composition. In such embodiments, the treatment compositions are 100% active ingredients, wherein the active ingredients include at least a fluorescent treatment compound and optionally include the treatment compound and/or one or more additives or adjuvants In some embodiments, the fluorescent treatment compounds or the fluorescent treatment compositions are fluorescent concentrates, wherein the total concentration of fluorescent treatment compound plus treatment compound in the concentrate is about 0.1 wt % to 98 wt %. In some embodiments, the fluorescent concentrate includes the fluorescent treatment compound and substantially excludes the treatment compound itself. In other embodiments, the fluorescent concentrate includes the treatment compound and the fluorescent treatment compound. In some embodiments, one or more additive or adjuvants such as solvents, polymers, surfactants, oils, stabilizers, or other components suitable for combining with industrial water sources are included in the fluorescent concentrate, as will be appreciated by one of skill. Where the one or more components of the fluorescent concentrate include solvent, the solvent is present generally at about 10% to 99.9% by weight of the fluorescent concentrate.

Methods of Treating Industrial Water Sources

In some embodiments, a method of treating an industrial water source comprises applying a fluorescent treatment compound to an industrial water source. In some embodiments, a method of treating an industrial water source comprises applying a fluorescent treatment composition to the industrial water source, the fluorescent treatment composition comprising at least one fluorescent treatment compound and at least one treatment compound, wherein the ratio of fluorescent treatment compound to treatment compound in the composition is about $1:10$ to about $1:1 \times 10^{11}$ by weight. In some embodiments, the fluorescent treatment composition is a fluorescent treatment concentrate. In embodiments, the applying further includes applying an amount of the fluorescent treatment compound, fluorescent treatment composition, or fluorescent treatment concentrate that is effective to carry out the intended treatment, further wherein the amount of fluorescent treatment compound applied is sufficient to quantify the amount thereof at least at one point downstream of the applying.

The intended treatments include inhibiting corrosion of surfaces contacted by the water source, inhibiting paraffin solidification and phase separation from the water source, preventing scale buildup due to the presence of e.g. calcium salts in the water source, stabilizing the water source against freezing, preventing phase separation from the water source, disinfecting or sterilizing the water source, resolving emulsified compounds from the water source, prevention of equipment fouling by components of the water source, precipitating, coagulating, or flocculating components of the water source, chelating metal ions present in the water source, and the like. By applying the fluorescent treatment compositions of the invention to an industrial water source in an amount suitable to provide an intended treatment, an amount of fluorescent treatment compound is also applied to the water source, wherein the amount of fluorescent treatment compound is effective to quantify the concentration thereof at least at one point downstream from the applying.

One exemplary embodiment of formulation and use of a fluorescent treatment composition of the invention that is a fluorescent corrosion inhibitor composition. It will be understood that the exemplary embodiment is not limiting and is provided solely to impart an understanding of the formulation and use of various fluorescent treatment compositions of the invention. FIG. 2 illustrates an example of a fluorescent corrosion inhibitor compound and the corresponding corrosion inhibitor compound. A blend of these two compounds is suitably formed to result in a fluorescent corrosion inhibitor composition of the invention. In such embodiments, such a composition is suitably applied to an industrial water source in need of corrosion inhibition. If the effective amount of the corrosion inhibitor in the industrial water source as determined by the operator is 100 ppm by weight, and the effective amount of fluorescent corrosion inhibitor needed to quantify the amount thereof downstream from the applying is 0.1 ppm by weight, then the ratio of corrosion inhibitor compound to fluorescent corrosion inhibitor compound in the fluorescent corrosion inhibitor composition is about 1:1000. The ratio selected is thus dictated by the specific treatment compound, specific industrial water source, and concentration of fluorescent treatment compound needed for effective quantification downstream from the applying of the fluorescent treatment composition. The rate of applying the composition to the water source is dictated by the rate of flow of the water source within a containment such as a metal pipe, wherein the rate of addition is suitable to provide about 100 ppm of corrosion inhibitor to the water source.

An advantage of the fluorescent treatment compounds is that the GQD fluorophore typically has fluorescence emission at a wavelength greater than about 550 nm, which is generally outside the spectral emission range of many compounds entrained within industrial water sources such as produced water and process waste water. Further, the emission spectra of the GQD are suitably selected or adjusted by selecting or adjusting a GQD particle size to provide the targeted range of emission wavelengths. Alternatively, GQD of different sizes are suitably blended, activated (GQD*) if desired or needed, and covalently bonded to a treatment compound to provide a targeted range of emission wavelengths. Thus, the GQD fluorophores are useful to synthesize fluorescent treatment compounds having a fluorescent signal that can be easily isolated from background fluorescence signals produced by industrial water sources, providing accurate quantification of the treatment compound or the treatment composition applied thereto.

The $\lambda_{max}$ of many fluorescent treatment compounds is about 300 nm to 550 nm, for example about 350 nm to 550 nm, or about 400 nm to 550 nm, or about 450 nm to 550 nm, or about 500 nm to 550 nm, or about 300 nm to 500 nm, or about 300 nm to 450 nm, or about 300 nm to 400 nm, with peak emission intensity of the fluorescent treatment compounds occurring between about 500 nm to 700 nm, or about 550 nm to 700 nm, or about 600 nm to 700 nm, or about 500 nm to 650 nm, or about 500 nm to 600 nm. In embodiments, the "red shift" of excitation to peak emission intensity wavelengths for the fluorescent treatment compounds is about 50 nm to 200 nm, or about 50 nm to 150 nm, or about 50 nm to 100 nm, or about 100 nm to 200 nm, or about 100 nm to 150 nm.

The emission, i.e. luminescence spectra of the fluorescent treatment compounds highlights a surprising and highly advantageous property thereof: the fluorescent emission of the fluorescent treatment compounds can be easily separated from the fluorescent emissions of hydrocarbons and other compounds and materials entrained in industrial water sources. For example, Karpicz, R., et al., *Lithuanian J. Physics* (2005) 45:213-218 report the peak emission wavelengths of crude hydrocarbon oil to be in the range of about 500 nm to 550 nm in many instances, with some refined petroleum products having peak emission intensity somewhat lower than this (e.g. 375 nm-450 nm). We have conducted emissions experiments with crude oil and condensates thereof entrained within produced water, and have found that using $\lambda$=500 nm as the excitation wavelength, the emissions intensity peak occurs at about 550 nm, with very low intensity emission at about 575 nm. Thus the peak emission intensity of the fluorescent treatment compounds is easily differentiated from the "background" emission of the crude hydrocarbon oil entrained in produced water by selecting fluorescent treatment compounds having a peak emission intensity greater than 550 nm, for example 575 nm or greater, such as up to 650 nm, for example. By sufficiently separating the "background" fluorescence of entrained materials present in industrial water sources from the fluorescence emission of the fluorescent treatment compounds, the concentration of the fluorescent treatment compounds in the industrial water source is easily measured in the presence of the entrained materials.

Thus, in embodiments, a method of treating an industrial water source comprises applying a fluorescent treatment composition to the water source to form a treated water source, wherein the fluorescent treatment composition comprises at least one fluorescent treatment compound. The fluorescence of the treated water source is measured at least at one point downstream from the applying and the dosing (rate of applying) is optionally adjusted based on the measured fluorescence. Automated dosage control of the treated water source can be achieved via fluorescence measurements, wherein measured amount of fluorescence downstream is used to direct the rate of applying the fluorescent treatment composition at the location of the applying.

Fluorometric analysis is suitably conducted using a light source and a fluorescence detector (e.g., fluorometer) configured to fluorometrically detect fluorescence as known in the art. In some embodiments, the fluorometric analysis is carried out using a light source capable of shining light at a particular wavelength, or range thereof, into a treated water source.

The invention provides the ability to monitor and control the dosage of treatment compounds online and in real time. The ability to automate treatment of industrial water sources improves the efficiency and reduces total cost of operation of industrial water source treatment systems. The compositions and methods of the invention can be used to improve effluent quality for regulatory compliance and system stability. The compositions and methods of the invention can also allow for more accurate chemical dosing for performance optimization and alarms on system issues, such as pump failures and empty chemical tanks, thereby reducing system upsets. The invention can be used in various wastewater automation processes, such as dissolved air flotation ("DAF") automation and clarification dosage optimization.

The fluorescent treatment compounds are usefully applied to industrial water sources that exhibit background (native) fluorescence when exposed to certain excitation wavelengths. In certain embodiments, the invention overcomes problems unarticulated in the art related to signal interference, i.e., overlap of treatment compound fluorescence emission wavelengths and industrial water source background fluorescence emission wavelengths). In embodiments, industrial water sources exhibit fluorescence emissions at wavelengths of less than about 550 nm. In some such embodiments, the fluorescent treatment compounds exhibit fluorescence at wavelengths greater than about 550 nm. Thus, in certain embodiments, a fluorescent treatment compound has a fluorescence emissions wavelength that does not substantially overlap with the fluorescence emissions of the industrial water source to be treated. In some such embodiments, a fluorescent treatment compound has a fluorescence emissions wavelength that does not overlap with any fluorescence emissions wavelength of the industrial water source to be treated.

The fluorescent treatment compounds of the invention are suitably applied to an industrial water source having a pH of from about 1 to about 13, for example from about 2 to about 12, from about 2 to about 11, from about 2 to about 10, from about 2 to about 9, from about 2 to about 8, from about 2 to about 7, from about 2 to about 6, from about 2 to about 5, from about 4 to about 11, from about 5 to about 11, from about 6 to about 11, from about 7 to about 11, from about 8 to about 11, from about 8 to about 10, from about 3 to about 10, from about 4 to about 10, from about 4 to about 8, or from about 5 to about 8.

While fluorescent treatment compounds are suitably applied to an industrial water source at any selected dosage rate, a fluorescent treatment compound is generally most effective at a dosage rate of from about 0.001 ppm to about 1,000 ppm based on weight of the industrial water source, or about 0.01 ppm to about 500 ppm, or about 0.01 ppm to about 100 ppm, or about 0.01 ppm to about 100 ppm, from about 0.01 ppm to about 75 ppm, from about 0.01 ppm to about 50 ppm, from about 0.01 ppm to about 25 ppm, from about 0.01 ppm to about 10 ppm, from about 0.01 ppm to about 5 ppm, from about 0.1 ppm to about 100 ppm, from about 0.1 ppm to about 75 ppm, from about 0.1 ppm to about 50 ppm, from about 0.1 ppm to about 25 ppm, from about 0.1 ppm to about 10 ppm, from about 0.1 ppm to about 5 ppm, from about 1 ppm to about 100 ppm, from about 1 ppm to about 75 ppm, from about 1 ppm to about 50 ppm, from about 1 ppm to about 25 ppm, from about 1 ppm to about 10 ppm, from about 5 ppm to about 100 ppm, from about 10 ppm to about 100 ppm, from about 25 ppm to about 100 ppm, from about 50 ppm to about 100 ppm, or from about 80 ppm to about 100 ppm based on weight of the industrial water source.

In certain embodiments, a fluorescent treatment compound can be used in a method of monitoring turbidity of wastewater and optionally adjusting dosage of the treatment compound based on the measured turbidity. In particular, the invention is directed to a method of treating wastewater comprising applying a fluorescent treatment compound to an industrial wastewater to form a treated wastewater, measuring the turbidity of the treated wastewater, and optionally adjusting a dosage of one or more turbidity-reducing treatments in the treated wastewater to further reduce turbidity. Optionally, the fluorescent treatment compound is applied as a fluorescent treatment composition.

In certain embodiments, the fluorescent treatment compound or composition is capable of lowering the turbidity of wastewater when present in wastewater having a turbidity of from about 1 NTU to about 20,000 NTU. Thus, in certain embodiments, the fluorescent tagged polymer is added to wastewater having a turbidity of from about 1 NTU to about 20,000 NTU, from about 1 NTU to about 10,000 NTU, from about 1 NTU to about 5,000 NTU, from about 1 NTU to about 1,000 NTU, from about 1 NTU to about 500 NTU, or from about 1 NTU to about 100 NTU. In certain embodiments, the fluorescent treatment compound or or composition is capable of lowering the turbidity of wastewater by at least about 50%. In certain embodiments, the fluorescent treatment compound or or composition is capable of lowering the turbidity of wastewater by at least about 75%. In certain embodiments, the fluorescent treatment compound or or composition is is capable of lowering the turbidity of wastewater by at least about 95%.

Experimental Section

Example 1

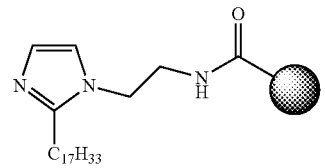

The compound shown above was synthesized according to techniques set forth in B. Neises, W. Steglich, *Angew. Chem. Int. Ed.*, 1978, 17, 522-524. To a mixture of carboxylic acid-functional Graphene Quantum Dot (GQD) (25 mg) and N,N-dimethyl-4-aminopyridine (1.3 mg, 0.01 mmol) in 0.5 mL of dimethyl formamide chilled in an ice-water bath, was added dicyclohexyl carbodiimide (9.06 mg, 0.04 mmol) in one portion. The mixture was stirred for 10 min, and then the ice bath was removed. The primary amino precursor compound corresponding to the structure above, 2-(2-heptadecyl)1H-imidazol-1-yl)ethan-1-amine:

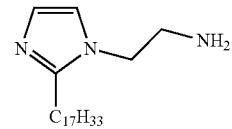

was added (28 mg, 0.04 mmol), and the mixture stirred at ambient temperature for 2 h. Then 2.5 mL deionized (DI) water was added to the mixture; then the mixture was centrifuged and washed with 1 mL of DI water twice. The solid particles obtained from the centrifugation were resuspended in 3 mL DI water with 1 drop of acetic acid. The product is referred to as GQD-1.

Then 40 µL of the above solution was irradiated at a wavelength of 475 nm and the emission maximum was observed at 515 nm.

2-(2-heptadecyl)1H-imidazol-1-yl)ethan-1-amine and GQD-1 are combined in water to form several solutions, wherein the concentration of 2-(2-heptadecyl)1H-imidazol-1-yl)ethan-1-amine is varied between 0.01 weight percent and 1 weight percent, and for each of these concentrations GQD-1 is further varied as a molar ratio of 2-(2-heptadecyl)1H-imidazol-1-yl)ethan-1-amine. These solutions are irradiated at 475 nm while emission intensity at 515 nm is measured. The measurements provide a concentration curve for determining 2-(2-heptadecyl)1H-imidazol-1-yl)ethan-1-amine concentration in water with high confidence.

A composition including 2-(2-heptadecyl)1H-imidazol-1-yl)ethan-1-amine and GQD-1 in a weight ratio of 999:1 is applied to an aqueous industrial processing stream in an amount sufficient to provide about 100 ppm of the 2-(2-heptadecyl)1H-imidazol-1-yl)ethan-1-amine. The aqueous industrial processing stream is irradiated at a wavelength of 475 nm and an emission maximum at 515 nm is observed. The emission intensity is proportional to the concentration of 2-(2-heptadecyl)1H-imidazol-1-yl)ethan-1-amine in the aqueous industrial processing stream.

Example 2

Triclosan, 5-chloro-2-(2,4-dichlorophenoxy)phenol, is functionalized with GQD according to B. Neises, W. Steglich, Angew. Chem. Int. Ed., 1978, 17, 522-524 using the following technique. To a mixture of carboxylic acid-functional Graphene Quantum Dot (GQD) (25 mg) and N,N-dimethyl-4-aminopyridine (1.3 mg, 0.01 mmol) in 0.5 mL of dimethyl formamide chilled in an ice-water bath, is added dicyclohexyl carbodiimide (9.06 mg, 0.04 mmol) in one portion. The mixture is stirred for 10 min, and then the ice bath is removed. Triclosan,

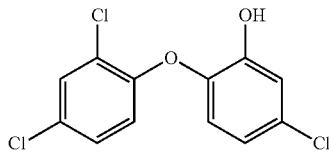 [SMILES: Oc1cc(Cl)ccc1Oc1ccc(Cl)cc1Cl]

is added (11.6 mg, 0.04 mmol), and the mixture is stirred at ambient temperature for 2 h. Then 2.5 mL deionized (DI) water is added to the mixture; then the mixture is centrifuged and washed with 1 mL of DI water twice. The solid particles obtained from the centrifugation are resuspended in 3 mL DI water with 1 drop of acetic acid. The product is referred to as GQD-2.

To enable direct measurement of the concentration of triclosan in the formulation during manufacturing, several compositions including triclosan and GQD-2 in various proportions are dissolved in water/ethanol similarly to the procedure in Example 1, and are irradiated at 475 nm while emission intensity at 550 nm is measured. The emission intensity measurements provide a concentration curve for determining triclosan concentration in water/ethanol mixtures with high confidence.

A triclosan-containing formulation for consumer cleansing, including both water and ethanol is manufactured to include 1 wt % triclosan and 500 ppb GQD-2 based on weight of the formulation. The formulation also includes additional ingredients that exhibit fluorescent emissions between about 450 nm and 500 nm when irradiated at 475 nm. A composition including triclosan and GQD-2 in a weight ratio of 999:1 is applied continuously to a flowing manufacturing process stream including water and ethanol, in an amount sufficient to continuously provide about 1 wt % triclosan in the process stream. The process stream is irradiated downstream from the triclosan addition at a wavelength of 475 nm, and an emission maximum at 515 nm is observed. The emission intensity is proportional to the concentration of triclosan in the process stream.

Example 3

A tall oil (C16-C18) adduct of diethylenetriamine imidazoline (TOFA-DETA) was reacted with a carboxylic acid-functional GQD using the technique of Example 1 to form "TOFA-DETA-GQD". TOFA-DETA is a material conventionally employed to prevent corrosion in metal pipes carrying aqueous industrial processing streams, especially those bearing petroleum/brine mixtures produced by petroleum product extraction from subterranean reservoirs.

Corrosion bubble cell tests were performed using the general procedure set forth in Andreev, N. et al., J. Corros. Scale Inhib. 2013, 2(1), 17-19. Conditions used were C1018 carbon steel electrode; 80° C.; $CO_2$ saturated aqueous dispersion including 3 wt % NaCl and 20 wt % of a hydrocarbon mixture (75 wt % LVT 200 hydrotreated light distillate, 25 wt % xylene); continuous $CO_2$ sparge; and atmospheric pressure. The brine/hydrocarbon mixture was first allowed to contact the C1018 carbon steel electrode for about 3 hours before adding the corrosion inhibitor to be tested. The testing was carried out on three samples by injecting a material into the heated brine/hydrocarbon mixture; all recited injection amounts are based on the weight of the water in the test cell.

In Example 3A, the GQD-t-TOFA/DETA synthesized above was injected into the heated brine/hydrocarbon mixture in an amount corresponding to the equivalent of 2 ppm TOFA/DETA functionality; 0.2 ppm 2-mercaptoethanol was injected along with the GQD-t-TOFA/DETA. In Example 3B, 2 ppm TOFA/DETA and 0.2 ppm 2-mercaptoethanol were injected into the heated brine/hydrocarbon mixture. In Example 3C, no materials were injected (Control).

Figure 5:
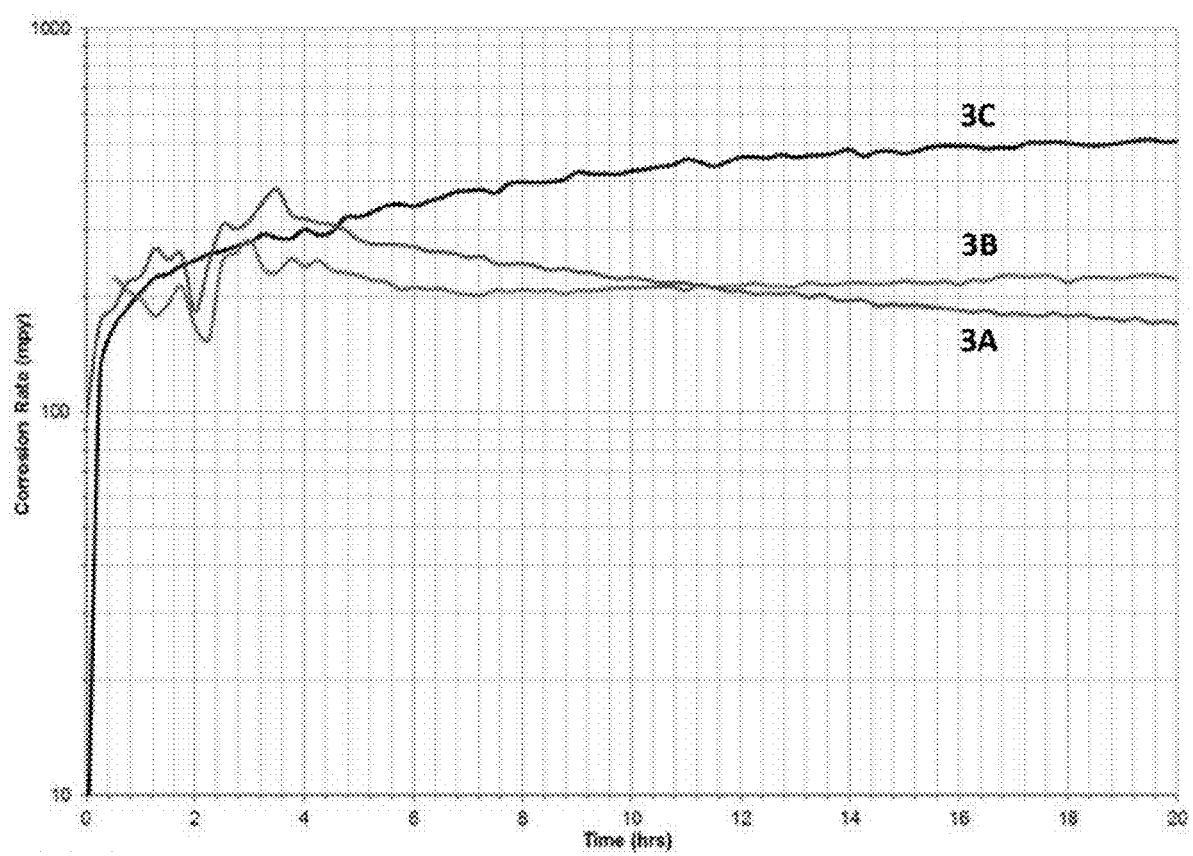
FIG. 5 is a plot showing corrosion inhibition performance as a function of time for a composition of the invention.

All three tests were allowed to proceed for a period of about 20 hours while corrosion was continuously measured. Corrosion rate (mpy) as a function of time is shown for 3A, 3B, and 3C in FIG. 5. Comparison of the Control Example 3C with Examples 3A and 3B in a snapshot at 15 hours into this test revealed that the corrosion rate of the carbon steel was reduced from about 300 mpy to about 180 mpy in Example 3A, and was similarly reduced to about 220 mpy in Example 3B. This shows that the GQD bonded to the corrosion inhibitor compound does not negatively impact the corrosion inhibition performance of the corrosion inhibitor functionality.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed:

1. A treatment composition comprising:
   a graphene quantum dot covalently bonded to a paraffin inhibitor polymer, wherein the paraffin inhibiting polymer is an alpha olefin-alkyl maleic anhydride copolymer, an ethylene-vinyl acetate copolymer, or an alkylphenol-formaldehyde copolymer.

2. The treatment composition of claim 1 wherein the covalent bond comprises a carboxyl or carboxamide group.

3. The treatment composition of claim 1 wherein the treatment composition luminesces at a wavelength of about 600 nm to 700 nm when excited by light having a wavelength of about 500 nm.

4. The treatment composition of claim 1 wherein the particle size of the graphene quantum dot is about 1 nm to 20 nm.

5. The treatment composition of claim 1 mixed with a solvent.

6. The treatment composition of claim 1 wherein the paraffin inhibitor polymer comprises an ethylene-vinyl acetate copolymer, an alkylphenol-formaldehyde copolymer, an acrylate homopolymer, an methacrylate homopolymer, an acrylate copolymer, a methacrylate copolymer, or a combination of two or more thereof.

7. The treatment composition of claim 1 wherein the alpha olefin-alkyl maleic anhydride copolymer comprises one or more alpha olefin monomers having the formula (I):

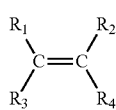
(I)

wherein $R_1$, $R_2$, $R_3$, and $R_4$ are independently selected from hydrogen and $C_5$-$C_{60}$ alkyl, with the proviso that at least two thereof are hydrogen; and an alkyl maleic anhydride monomer having the formula (II):

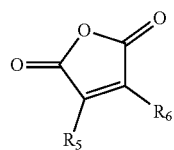
(II)

wherein $R_5$ and $R_6$ are independently selected from hydrogen or $C_1$-$C_{30}$ alkyl.

8. The treatment composition of claim 5 wherein the solvent comprises about 10% to 99.9% by weight of the composition.

9. The treatment composition of claim 1 wherein the paraffin inhibitor polymer is effective to prevent deposition of petroleum-based solids on surfaces contacted by industrial water sources carrying hydrocarbons.

10. The treatment composition of claim 7 wherein the alkyl maleic anhydride monomer comprises about 0.01 to 2.0 equivalents of a $C_{12}$-$C_{60}$ alkanol or amine per equivalent of anhydride.

11. A treatment composition comprising: a mixture of a graphene quantum dot covalently bonded to a paraffin inhibitor polymer, wherein the paraffin inhibiting polymer is an alpha olefin-alkyl maleic anhydride copolymer, an ethylene-vinyl acetate copolymer, or an alkylphenol-formaldehyde copolymer; and an amount of the paraffin inhibitor polymer.

12. The treatment composition of claim 11 wherein the mixture comprises about 0.1 wt % to 98 wt % of the composition.

13. The treatment composition of claim 11 wherein the ratio of the graphene quantum dot covalently bonded to the paraffin inhibitor polymer, to the paraffin inhibitor polymer in the mixture is about 1:10 to about $1:1\times10^{11}$ by weight.

* * * * *